United States Patent [19]
Kuehnle

[11] 3,973,956
[45] Aug. 10, 1976

[54] ELECTROPHOTOGRAPHIC PROCESS EMPLOYING SIGNAL COMPARISON

[75] Inventor: Manfred R. Kuehnle, Lexington, Mass.

[73] Assignee: Coulter Information Systems, Inc., Bedford, Mass.

[22] Filed: Nov. 25, 1974

[21] Appl. No.: 526,844

Related U.S. Application Data

[62] Division of Ser. No. 397,309, Sept. 14, 1973, Pat. No. 3,864,035.

[52] U.S. Cl. .................................. 96/1 R; 96/1 C
[51] Int. Cl.² .................. G03G 13/02; G03G 13/24
[58] Field of Search .............................. 96/1 R, 1 C

[56] References Cited
UNITED STATES PATENTS

| | | | |
|---|---|---|---|
| 2,543,051 | 2/1951 | Oughton et al. | 96/1 R |
| 2,853,383 | 9/1958 | Keck | 96/1 R |
| 3,124,456 | 3/1964 | Moore | 96/1 R |
| 3,185,051 | 5/1965 | Goffe | 96/1 R X |
| 3,251,685 | 5/1966 | Bickman | 96/1 R |
| 3,321,307 | 5/1967 | Urbach | 96/1 R |
| 3,406,334 | 10/1968 | Maquart et al. | 96/1 R X |
| 3,449,658 | 6/1969 | Robinson et al. | 96/1 R X |
| 3,680,955 | 8/1972 | Yata et al. | 96/1 R X |
| 3,788,739 | 1/1974 | Coriale | 96/1 R X |

*Primary Examiner*—David Klein
*Assistant Examiner*—John R. Miller
*Attorney, Agent, or Firm*—Silverman & Cass, Ltd.

[57] ABSTRACT

An electrostatic imaging method wherein the photoconductive coating of an electrophotograhic film is charged simultaneously with its exposure to a scene to be recorded, the charging step ceasing when a level of charge has been reached which is optimum for the light condition of the scene and with toning being commenced immediately subsequent to the cessation of the charging. Light from the scene is cut off immediately prior to commencement of toning. The film utilized is capable of accepting a charge at a rate faster than the light of a scene to be recorded discharges the film.

The method is preferably practiced utilizing a camera which includes projecting means for prjecting a scene onto the film, a corona generating system, a toning system, means for measuring the light coming through the projector, means for measuring the surface potential of a dark area of the flm while it is being charged and an electronic control circuit which operates the charging system in response to the measured light.

13 Claims, 5 Drawing Figures

ELECTROPHOTOGRAPHIC PROCESS EMPLOYING SIGNAL COMPARISON

CROSS-REFERENCE TO RELATED APPLICATIONS

This application is a divisional application of parent application, Ser. No. 397,309, filed Sept. 14, 1973 for SHUTTERLESS CAMERA SYSTEM, now U.S. Pat. No. 3,864,035 issued Feb. 4, 1975.

The basic method of and apparatus for utilizing peak potential surface charge for adjusting the sensitivity of the electrophotographic film of the camera disclosed and claimed herein are disclosed in two copending applications:

"IMAGE RECORDING METHOD FOR ELECTRO-PHOTOGRAPHIC FILM", Ser. No. 389,149, filed Aug. 17, 1973; and "IMAGE RECORDING APPARATUS FOR ELECTRO-PHOTOGRAPHIC FILM", Ser. No. 389,124, filed Aug. 17, 1973, now U.S. Pat. No. 3,880,512 issued Apr. 29, 1975.

Reference will be made herein to the electrophotographic film which is disclosed and claimed in a copending application entitled: "ELECTROPHOTOGRAPHIC FILM, METHOD OF MAKING AND USING THE SAME AND PHOTOCONDUCTIVE COATING USED THEREWITH", Ser. No. 378,180, filed July 11, 1973.

Reference will be made herein to a toning method and apparatus which is disclosed and claimed in a copending application entitled, "METHOD AND APPARATUS FOR PROCESSING ELECTROSTATIC IMAGES", Ser. No. 323,108, filed Jan. 12, 1973, now U.S. Pat. No. 3,878,817 issued Apr. 22, 1975.

Reference will be made herein to a photoelectric cell which is disclosed and claimed in a copending application entitled "TRANSPARENT PHOTOCELL", Ser. No. 397,308, filed Sept. 14, 1973.

All of the above applications as well as the present one are owned by the same assignee.

BACKGROUND OF THE INVENTION

The invention herein relates generally to cameras but particularly is concerned with a camera or a camera system which uses an electrophotographic film as the light responsive member upon which an image is to be recorded.

The electrophotographic film which is used in the camera of the invention is described in detail in copending application Ser. No. 378,180. It differs in many basic and important respects from the photosensitive film of the so-called silver halide type that is used today for relatively high speed photography. Such electrophotographic film, while generally operating on the basis of certain principles that it has in common with known electrostatic members also differs radically from such members in its composition, speed and characteristics.

The conventional photographic film has a relatively thick emulsion which is light sensitive. Black and white film uses a silver halide emulsion as mentioned above and colored film uses complex plural layers of light sensitive dyes in addition as photosensitive means. Such photographic films are highly light sensitive and hence must be manufactured in the dark or under special light conditions; cannot be stored or transported except in light-tight packages; must be introduced into a camera in darkness and maintained in darkness within the camera until use, and must be removed from the camera and processed in darkness or special light. Aside from these difficulties, conventional photographic film is sensitive to temperature and humidity; has limited shelf life; in most cases is grainy with the grain size increasing with film speed. Film speed as a general rule is controlled by the materials from which the photographic film is made and the methods of making the same such that the ambient light conditions existing when the film is used become a factor which the user must consider with some delicacy. The size of the aperture and speed of the shutter of the camera which carries the film must be adjusted for theoretically optimum results, which, notwithstanding automatic cameras, is not always truly optimum.

As an example of the problems mentioned, if a user assumes that a set of conditions will exist for outdoor photography that warrants the use of low speed film, as for example bright sunshine, he will install such film in his camera. Thereafter, should the ambient conditions change to, for example, heavy overcast, the film speed may be too slow for the types of scenes needed to be recorded, even at the largest aperture and slowest speeds of the camera. Even if the camera system permits of such size opening and speed capable of capturing the desired images, depth of focus will suffer because of the necessity of using large apertures. The user may be required to change film in the field and often in the middle of a roll.

While the above problems are inherently solved by the electrophotographic film of the copending application Ser. No. 378,180, the invention herein enhances the value of the said electrophotographic film by providing a vehicle to enable the best characteristics of the film to be utilized. The film sensitivity is adjusted in accordance with the ambient light conditions so that it is immaterial to a great extent what such light conditions may be. Further, in the conventional photographic film of the silver halide type the range of greys is substantially limited, but the camera of the invention which uses the electrophotographic film of the copending application Ser. No. 378,180 provides an almost unlimited range of grey tones with little regard to the ambient light conditions. The basic concepts of adjustment of sensitivity of the electrophotographic film used in the camera of the invention are disclosed in copending applications Ser. Nos. 389,124, and 389,149.

One of the most delicate and critical components of a modern camera or camera system intended to use light-sensitive photographic film is the shutter. The shutter serves two important purposes in the modern camera, the first of which is to keep the emulsion of the film in total darkness until it is used, the second of which is to time precisely the exposure of the film. The camera of the invention eliminates the shutter and much of the expensive, complex attendant mechanisms required to control the shutter.

The electrophotographic film of copending application Ser. No. 378,180 may be exposed to light at all times prior to its use so that no special precautions need be taken to keep it in darkness. When it is to be used, it can be exposed to a still scene without a shutter and charged while at the same time being exposed as will be explained. Even moving scenes could be "stopped" under certain circumstances, although at the present state of the art it would be preferred to use a shutter for moving scenes. The criterion of a shutterless camera, in any event, revolves around the inertness of the uncharged film when exposed to light.

The electrophotographic film used with the camera of the invention is not light sensitive in the sense that any permanent chemical change occurs when it is subjected to light. The photoconductive coating of the electrophotographic film is charged by being subjected to a relatively high potential corona and the impinging photons from the ambient light cause the flow of electrons from the surface of the coating and holes to the surface of the coating in proportion to the amount of incident light reaching each increment of the coating. The latent image is represented by an absence of electrons at the incremental locations which have received light and a presence of electrons at the incremental locations which have not received light from the scene to which the electrophotographic film is exposed. The incremental areas between absolute darkness and maximum light have variable degrees of electrons at or near the surface of the coating and represent grey tones of the scene.

The camera of the invention is in effect an image recording device which operates on the very basic of principles which are embodied in the well-known xerographic and electrofacsimile (electrofax) copying machines known at the present time. The essential differences between the camera of the invention and the image recording devices of the prior art lie in the simplicity and flexibility of the camera of the invention and its speed. While it is to some extent an important consideration that the electrophotographic film to be used with the camera of the invention provides a major basis for the advantages and versatility of the camera, the apparatus itself has inherent aspects which are of great benefit independently of the type of film used.

The xerographic and electrofax apparatus as known utilize fixed charging times, fixed lighting conditions and fixed exposures. The slow speed of the electrostatic members and their slow charge acceptance contribute also to the nature of the apparatus and complexity of known copying machines. Their use as cameras in the same sense as the conventional photographic cameras is in most cases impractical if not impossible. For example, it is believed to be outside of the realm of practicality to build a hand-held camera of a so-called pocket or portable size which utilizes the structures and principles of the modern xerographic or electrofax equipment; hence it is certainly not obvious to those in this field that such could be done. To build such a camera for still photography would seem to pose great problems, and to achieve the capture of moving images on electrostatic members clearly would exacerbate the problems. The invention teaches the solution of the problems to achieve a practical still camera and points the way to the achievement of a camera for moving scenes.

Further to emphasize the achievement of the invention, at least some of disadvantages of the conventional photographic camera have been obviated by utilizing a camera without a shutter. Thus, the disadvantages of both the conventional camera and the electrostatic apparatus of the prior art are eliminated and the result is a remarkable camera that has great utility.

In the known electrostatic apparatuses the electrostatic member, typically a coating of amorphous selenium on metal or a coating of a zinc oxide-resin mixture on a sheet of conductive paper, must first be charged in darkness for a substantial period of time. A charging period of one second or thereabouts is common. The charging in darkness is needed to preserve as much charge as possible, and the time of charging is long because these members do not accept charge at a fast rate. The next step involved is the exposure to a scene, and this is of necessity done with brilliant light projecting an image onto the charged surface of the electrostatic member. As stated, the time of exposure is fixed and the amount of light is fixed since the process takes place on a light table and the image is projected onto the surface of the member by various systems of mirrors, lenses, etc. The exposure time is relatively long, typically a second or large fraction thereof because the light discharge of these members is slow and the exposure time must be long to achieve good images. At that, the images which are produced are photographically of poor quality, even with the best of the known copying apparatus.

The camera of the invention operates in a simple manner with the electrophotographic film mentioned above, or any other film which has speed and charge acceptance that is comparable. The various factors involved include charge time and hence surface charge potential, size of aperture of the projecting system, time of toner application and the bias used during toning. It will be noted that time of exposure is not mentioned, it being the same as the time of charging as will be explained. Means for adjusting several factors may be provided in a practical camera, but the simplest camera according to the invention provides only for the adjustment of the time of charge.

SUMMARY OF THE INVENTION

The method of the invention includes the subjection of an electrophotographic film to ambient light without a shutter and toning the film when it is desired to record the viewed image on the same. The method of the invention involves the charging of the film simultaneously with the exposure of the film to the scene to be recorded and the cessation of the charging when the charge has reached a predetermined level considered optimum for the light conditions of the scene with the toning of the film commencing iimmediately following the cessation of the charging thereof. Provision is made for adjusting at least one of the factors involved in achieving a fixed image in response to the amount of light flux while all of the others are fixed so that the camera is simple and economical. In a preferred example, the factors are all fixed except for the charging potential. The potential to which the electrophotographic film is charged is varied in accordance with the incident light in order to vary the sensitivity of the electrophotographic film.

The incident light is measured by means of a light meter and the film charged, the amount of charge being measured by an electrostatic probe. When the compared signals from the probe and the light meter reach the relationship which has been established by the circuit, the charging ceases and the electrophotographic film surface is suddenly flooded with toner suspension. A suitable heat source may be provided to fix the toner before the charge of the film has materially decayed.

Toners which are at least temporarily self-adhering may be utilized to enable inspection of the recorded scene and/or subsequent fixing without concern that the toner will drop off. As a matter of fact, most toners, once electrostatically attracted by and adhered to the charged increments of the photoconductive coating will maintain their positions tenaciously even without fixing. This is due to their intimate physical engagement with the surface and does not rely upon the maintenance of charge.

DESCRIPTION OF THE PREFERRED EMBODIMENTS

The invention as previously mentioned comprises a camera or camera system which utilizes the electrophotographic film of copending application Ser. No. 378,180 and which eliminates the complex shutter and shutter mechanism of the conventional camera.

Figure 1:
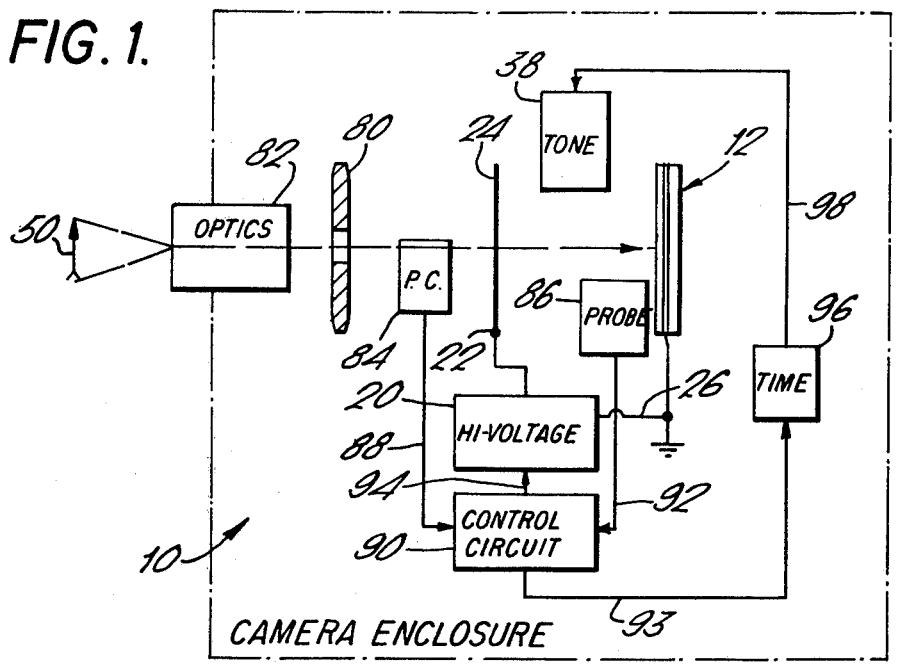
FIG. 1 is a highly diagrammatic view showing the basic components of a simple camera without shutter constructed in accordance with the invention, the diagram being utilized primarily in order to explain the basic construction of the camera.
Figure 2:
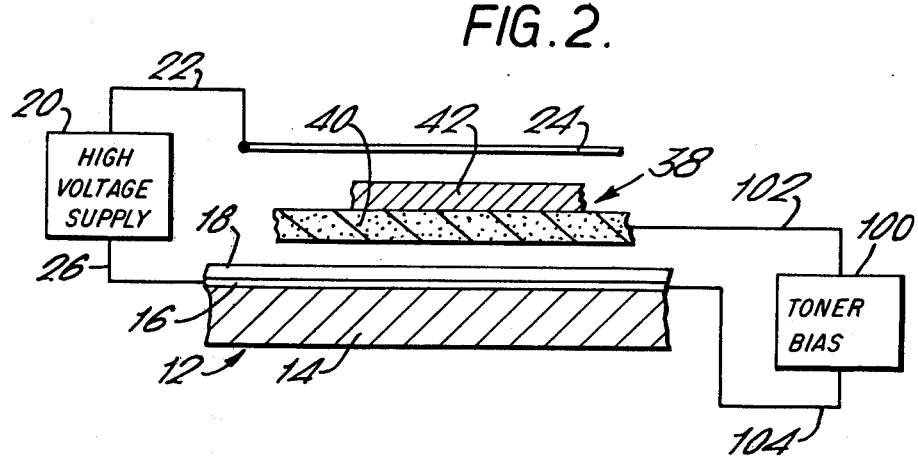
FIG. 2 is a fragmentary sectional view taken through the electrophotographic film used with the camera of the invention and showing toning means used in connection with the camera.
Figure 3:
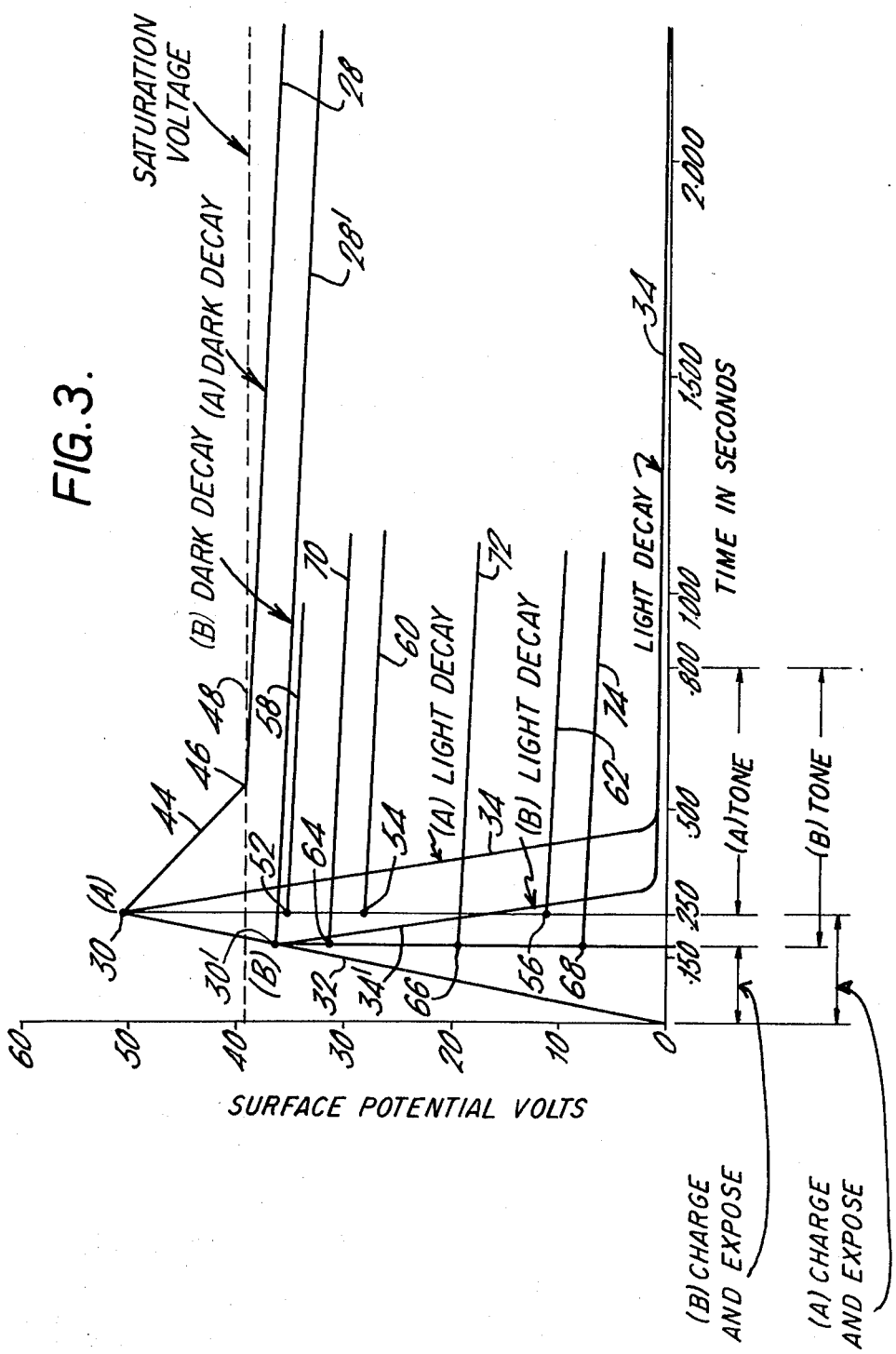
FIG. 3 is a chart or graph showing some of the characteristics of the electrophotographic film to be used in the camera and presented as an explanation of the phenomena that are believed to occur during the use of the camera.

Reference may first be had to FIGS. 1 to 3 inclusive for the basic principles of the camera and a discussion of the phenomena which are involved.

According to the invention, the camera 10 of the invention is intended to be so simple as to require substantially no adjustments or measurements to be made by the user in order to record a scene. The optical system of the camera is pointed to the scene which is to be recorded and a trigger or button is operated. The camera does the rest. If the camera is of the fixed focus type there is not even a need to focus the optical system.

The camera of the invention requires the use of electrophotographic film 12 of the type which is described in the copending application Ser. No. 378,180 and which is illustrated in sectional view in FIG. 2. There is a substrate member 14 of some stable plastic such as "Mylar" a fraction of a millimeter thick having a conductive thin film coating 16 intimately bonded thereto of a thickness about 500 Angstroms and carrying another thin film coating 18 of a photoconductive material about 3000 Angstroms thick. The conductive coating 16 can be of indium oxide deposited by radio frequency sputtering on the substrate member 14 and the photoconductive member can be cadmium sulfide likewise sputtered as disclosed in said copending application, Ser. No. 378,180.

When the surface of this electrophotographic film 12 is charged by a corona, as indicated in FIG. 2, through the use of a high voltage supply 20 connected at 22 to a fine wire 24 stretched in proximity to the surface of the photoconductive coating 18 there is an electrostatic corona effect which occurs. The high voltage supply 20 is connected through lead 26 to the conductive coating 16 and hence the surface of the photoconductive coating is charged with an excess of electrons disposed at the surface, the holes of the coating 18 migrating toward the conductive coating 16.

When the charge corona is removed, the charge corresponding to free electrons remains on or at the surface of the photoconductive coating 18 but forms charge carriers which gradually seek to combine with holes in the coating 18. Assuming that the surface is kept in complete darkness, the rate at which the electrons move to a combined or stable distribution is represented by the so-called dark decay curve of the film 12. In FIG. 3 one dark decay curve is shown at 28, this corresponding to the characteristics of a film such as 12 which has been charged to a surface potential 30 along a charge characteristic 32.

If instead of remaining in the darkness the surface of the photoconductive coating 18 has been subjected fully to a maximum light condition, the electrons would migrate from the surface of the photoconductive coating 18 toward the conductive coating 16, being replaced by oppositely migrating holes and the charge potential on the surface of the coating 18 would decay along the graph line 34 this being known as the light decay curve. For any conditions of light between these extremes, the charge at any increment of the surface of the photoconductive coating 18 would decay at some intermediate rate thereby providing a myriad of different charge conditions all over the surface of the coating 18 when the surface is subjected to a variegated light pattern after having been charged.

Thus, if a light pattern has been projected onto the surface of the coating 18 after it has been charged, the charge pattern which is produced on the surface comprises a latent image of the light pattern, but decays gradually according to the characteristics of the electrophotographic film 12 which include the ability to keep the charge gradations.

As understood from the discussions in the copending applications, if toner particles are distributed over the surface of the coating 18 while the latent image is still present, these toner particles will adhere to the surface 18 in proportion to the number of electrons present at any increment of surface. The toner particles are charged electrophoretically by suspension of these particles in a suitable dielectric diluent which includes surfactants. The electric field represented by the distribution of electrons thus attracts the toner particles in proportion to the respective amount of charge of the increments. Thus, the latent image is "frozen" by the presence of the toner particles. If the toner is in the form of a suspension in some diluent, the particles will usually adhere so long as their moisture remains. For many toners, even after drying, the particles will adhere even with the charge fully decayed. In any event, there will be more than sufficient time for inspection of the toned image without concern for loss of particles prior to fixing. If not satisfactory, the layer of toner can be wiped off and the film re-used.

As soon as the film 12 has been subjected to the toner and the resulting visible image is satisfactory, a flash of energy such as from a small heat lamp will fuse the toner particles to the surface of the coating 18 and fix the visible image to the film 12 permanently. In the case of certain toners, the diluent may include an adhesive quality obviating the need for heating to fix the same.

In FIG. 2 a toner device is shown at 38, comprising a toner source 40 for example of the type disclosed in copending application Ser. No. 323,108 adapted to be expressed or emptied in some way by means of a member 42. It is assumed that the toner device 38 will not be present when the film 12 is being charged and exposed to a light pattern. It will move into position, or the film 12 will be moved into position, after the exposure of the surface of the photoconductive coating 18.

The film of the copending application, Ser. No. 378,180, is totally different from the xerographic and electrofax electrostatic members of the prior art. Its photoconductive coating is capable of accepting a charge very rapidly and may be charged to potentials which are substantially above saturation voltage without causing electrical breakdown. Saturation is understood to mean the surface potential at which further charge will not result in any increase in retained charge since the charge leaks off as fast as it is added. Conventional electrophotographic members are charged only to saturation because they will not accept a charge as fast as the film 12. Notwithstanding this, the photoconductive coating is so thin that the surface voltages involved are of the order of ten times smaller than the voltage encountered in known apparatus, whereas the field strength is substantially higher.

The film 12 of said co-pending application, Ser. No. 378,180, includes a coating 18 which is unique in many respects, one of which is its extremely high gain. Gain of a photoconductive coating is understood to mean the number of discharged electrons which is produced due to the impingement of a single photon. In the case of prior art photoconductive coatings as utilized in practical apparatus, a gain of more than one is considered excellent. The coating of the film 12 has a gain which is at least $10^6$ so that extremely large electrical currents are produced by the light received by the coating. This high gain characteristic means that the film is very fast and provides a wide range of grey tones.

Aside from the above, the film 12 is transparent, durable and abrasion resistant, nonresponsive to light before charging and has no grain. The coatings are inorganic and hence inert to most conditions of heat and humidity which would destroy ordinary film. The substances from which the coatings are made from crystals as deposited of a size that is invisible to the eye and substantially less in size than any known fine grain in conventional photographic films.

According to the invention, the sensitivity of the film 12 is adjusted automatically in accordance with the light which is impressed on the photoconductive coating. Since the higher the charging potential, the more sensitive the film 12, it is practical to use lower charging potentials when the light is greater. In short, the camera is constructed to charge the electrophotographic film 12 to a potential whose voltage varies inversely as the average incident light.

Consider FIG. 3, the corona wire 24 is connected to the high voltage supply 20 and placed in the vicinity of the photoconductive coating 18 so that as the voltage of the corona wire 14 increases the potential on the surface of the coating 18 at a location in complete darkness follows the line 32 at a very steep rate and in a very short time. For the purpose of the explanation, two conditions of ambient light are considered in the chart of FIG. 3, one in which the amount of light is less than the other. These conditions are identified as condition A where the light from the scene to be recorded is low, and condition B where the light from the scene is high. These are arbitrary conditions, no specific light values being reflected in the graph of FIG. 3, the only criterion being that the two light conditions differ from one another.

The graph of FIG. 3 does not precisely illustrate the phenomena which occur during the two conditions A and B but will be useful in explaining the operation of the camera under these two conditions. Condition A is one in which the average of ambient light is not as intense as in the case of condition B; hence the surface potential of the coating 18 is expected to be higher than that for condition B. This is represented by the fact that the charge line 32 rises to the potential 30, which is about 52 volts in FIG. 3 for condition A but rises only to the potential 30' which is about 37 volts for the condition B.

It should be borne in mind that according to the invention, there is no shutter in the camera 10 and hence the film 12 is being subject to the light of a scene at all times during the charging period. In the graph of FIG. 3 this time is .250 second for condition A and .150 second for condition B. Thus, the different increments of the film are being charged and discharged simultaneously. The creation of any image at all demands that the film accept charge at a speed faster than the impinging light of the scene dissipates the charge, so that there will be a balance of charge remaining which will accept toner. Furthermore, the distribution of charge must be over a wide gradient to provide the gray scale needed for photographic quality.

The electrophotographic film 12 is fully capable of performing as required, and thus, the exposure time for any condition may be the same as the charge time so that when the surface potential chosen for the particular light conditions has been reached, the exposure is completed. The surface of the film having been exposed all during the period of charging, there will be a latent image already present in a variegation of charge and there is nothing remaining to be done except immediately to tone the surface 18 in order to bring out the image.

In FIG. 3, the two maximum surface potential points 30 and 30' represent the charge reached at an increment of the film 12 which is in complete darkness, and indeed, in locating the measurement device for detecting surface potential as will be seen, it is placed at a location which will remain in darkness. For condition A, the dark decay curve would follow the line 44 and 28. The rapid discharge from the point 30 to the point 46 represents the dark decay curve losing charge at a high rate since the point 30 is substantially above saturation level 48. The portion 28 of the dark decay curve for condition A has a very small slope which means that the charge is retained in the darkened areas for a relatively long period of time. The toner particles will adhere more readily to the portions of the film which retain their charge.

Now, assuming that there is an increment of the film 12 which has been fully charged in darkness, and that this increment is illuminated to the maximum, the potential of that increment will rapidly drop along the light decay curve 34 practically to zero. Toner particles will not adhere to any increments which have no charge and hence the areas which are represented by the flat portion of the curve 34 will be practially without any toner particles.

These extremes of charge, say at the time .600 second demonstrate that the film is capable of extremes of toned and untoned areas, hence a very wide range of greys and good contrast - this spelling practical photographic quality.

It should be appreciated that illuminated area whose charge characteristic will follow the curve 32. This is because as charge is applied to the surface 18 by the corona produced by the wire 24 at the same time the light from the scene 50 (FIG. 1) is discharging the film. There will be an excess of charge remaining when the charging is completed, but the manner in which the individual increments reach their respective charge conditions is complex and difficult to illustrate by means of a simple graph. At the end of the charging time, which is represented by the time line .250, three typical increments which were illuminated by different light intensities are illustrated as having the surface potentials represented by the points 52, 54 and 56. If the film were suddenly placed in darkness at this time, each of these increments would commence to lose charge along intermediate dark decay curves 58, 60 and 62 respectively.

For condition B, the dark decay curve 28' starts at the point 30' but has no sharp drop equivalent to the portion 44 of the condition A dark decay curve because the point 30' is below saturation. Recall that this is for a light condition which has a greater intensity than the condition A and the film need not be as sensitive. Actually, the light decay curve 34' will not be as steep as the curve 34 because of the decreased gain. The higher charging voltage is not needed because the amount of light will be more than under condition A. The difference will be too little to notice on a graph of this scale.

Again, three differently illuminated increments will have different surface charge potentials as illustrated at 64, 66 and 68, all lying on the line .150 second. If placed in darkness at this time, the dark decay curves followed by the respective points would be 70, 72 and 74.

The time for the charging of condition B and likewise the exposure time comprise .150 second, which is less than for the condition A. The latter was a condition of low light intensity.

The toning period begins immediately following the end of the charging period for any condition of lighting according to the invention because, unlike other electrostatic apparatus, in this case there is no separate exposure period. The exposure is taking place while the photoconductive surface is being charged. Toning covers the surface of the film 12, literally flooding the same, cutting off light. In any event, a simple blind may be operated simultaneously with the commencement of toning to prevent further discharge of the coating 18.

Conveniently, suitable timing means may be provided in the camera 10 so that the toning device 38 completes its operation at substantially the same time regardless of the total time of charge. This works out to be an advantage because the lower the surface charge potential of an electrostatic member, the longer the toning should be effected. This obtains from the principle that toner particles adhere more readily to higher potential charges. Thus, in the graph of FIG. 3, for the condition A the toning period is .550 second while for condition B the toning period is .650 second. Both toning periods end at .800 second so that it is relatively simple to build an electrical or mechanical device which will stop the toning at a predetermined time after the charging period commences, irrespective of how long the latter period is. In practically all cases, the toning time will give satisfactory results.

It is feasible to have toning timing means which responds to the charging time or the surface potential, without regard to whether all toning periods end at the same time or not. The electrical or mechanical device operates in accordance with a predetermined relationship controlled by the charging time or surface potential.

Adverting now to FIG. 1, the camera 10 has an iris or aperture 80 which may be adjusted for best depth of focus. The optical system 82 of suitable lenses of conventional construction passes the light from the scene 50 through the iris or aperture to the electrophotographic film. The spacing of the various components in FIG. 1 is not proportional, the arrangement having been spread out to show the general location of said components.

In accordance with the invention, a photocell 84 or other photoresponsive device intercepts at least some of the light from the scene 50. One convenient way of constructing the camera 10 is to locate the photoresponsive device 84 behind the electrophotographic film 12 but a disadvantage of this is that there will be some filtering of the incident light effected by the film so that the response of the device 84 may not be an accurate measure of the incident light. It is preferred that the photoresponsive device is positioned on the housing of the camera with its optical axis parallel to the optical axis of the optical system 82 to receive and measure light from the same light source. It is even more advantageous to utilize the type of structure described in copending application Ser. No. 397,308 in which the photocell 84 is transparent and is coated on one of the lenses of the optical system 82 in order to intercept and respond to all of the light passing through the optical system. This is intended to be included under the coverage of the invention notwithstanding the illustration of FIG. 1 shows an interception of only a portion of the light between the iris 80 and the electrophotographic film 12.

The film 12 is charged by a suitable wire 24 located in such a manner as to produce a corona which will affect the photoconductive surface 18 (that faces to the left in FIG. 1) when energized by a high voltage supply 20 connected thereto at 22. The charge which is produced on the film 12 is measured by means of a suitable electrometer including a probe 86 located at a position close to the photoconductive coating 18 and preferably in a dark part thereof such as a border or corner. The reason for this is that a more uniform and predictable response can be obtained which may be related to the incident light for purposes of controlling the sensitivity of the electrophotographic film 12.

Assuming that the optical system 82 has been manually adjusted to focus the scene 50 properly on the surface of the film 12 and the iris 80 has been properly adjusted to give the desired depth of field, the electrical and/or mechanical system of the camera is started by the operator. The charging of the surface 18 is commenced by the high voltage source 20 and the surface potential commences to rise, as for example along the line 32 of FIG. 3. At the same time, the photoresponsive device 84 measures the light from the scene 50 and provides a signal which is channeled by the line 88 to a comparison device which is a part of the control circuit designated generally 90. The probe signal appears on the line 92 and is also applied to the comparison device. Suitable circuitry for effecting such comparison is disclosed in copending application Ser. No. 389,124 but other arrangements are known and may be used.

When the comparison device senses that the signals from the photocell 84 and the electrometer probe 86 have a given relationship which has previously been determined as optimum by suitable adjustments of the circuitry and measurements made, a signal is produced in the control circuit 90 (which in certain kinds of comparison devices may be considered the equivalent of absence of signal, in logic) which disables the high voltage supply 20. The signal for example can appear on the line 94. The simplest form of relationship which can be built into the control circuit 90 would be one in which the disabling signal for cutting off the high voltage supply is produced when adjusted inputs to a differential amplifier are equal so that there is a change in the state of the output of the differential amplifier.

With the disabling of the charging circuit of the camera 10, the charge distribution for a latent image has been reached represented by the time .250 second for condition A or the time .150 for condition B of FIG. 3. At this point in time the control circuit 90 is arranged to provide a toning signal of some king. This could be a visual or audible signal directing the operator to tone the film 12, this being effected by manually operating the toning device 38 or activating a control which will electrically or manually perform the function of flooding the surface 18 with liquid or powder toner. It is preferred that the toning operation be performed automatically by the signal from the control circuit 90 and this could be in the form of a trigger signal that appears on the line 93 and energizes or enables the toning device 38. There is illustrated a timing device 96 connected to the toning means 38 by the line 98. The timing is as stated above, either preset or controlled in accordance with the surface potential reached (or referred to the time required for charging).

Toner biasing means 100 are preferably connected from the toner device 38 to the ohmic layer 16 as shown in FIG. 2 by the lines 102 and 104. It is feasible to apply a control signal to the toner biasing means 100 for adjusting the bias voltage in accordance with the surface potential reached for adjusting the image produced during toning. High potentials do not require as high a toner propelling bias as low potentials. Such a control can serve as an alternate to the timing of the toning period; can serve as an economical alternate to the control of the charging voltage with respect to light, or may be an added feature in a more complex camera. In the case of its use instead of the control of charging time, the charging voltage would be fixed, the time of toning would fixed and the bias for propelling toner would then be adjusted in accordance with the intensity of incident light as measured by the photoresponsive device 84. The toner bias circuit 100 would then be connected to the control circuit 90 for the comparison to be made.

After toning, the toner may be fixed by suitable means in the camera 10 (not shown in FIG. 1) or the electrostatic film member 12 may be removed and inspected and thereafter the toner fixed if the visible image is satisfactory. If not satisfactory, the unfixed toned image may be wiped off and the film returned to the camera for the scene to be recorded once more. The fixing may occur outside of the camera 10 or on its interior by the use of a light flash device, for example.

Figure 4:
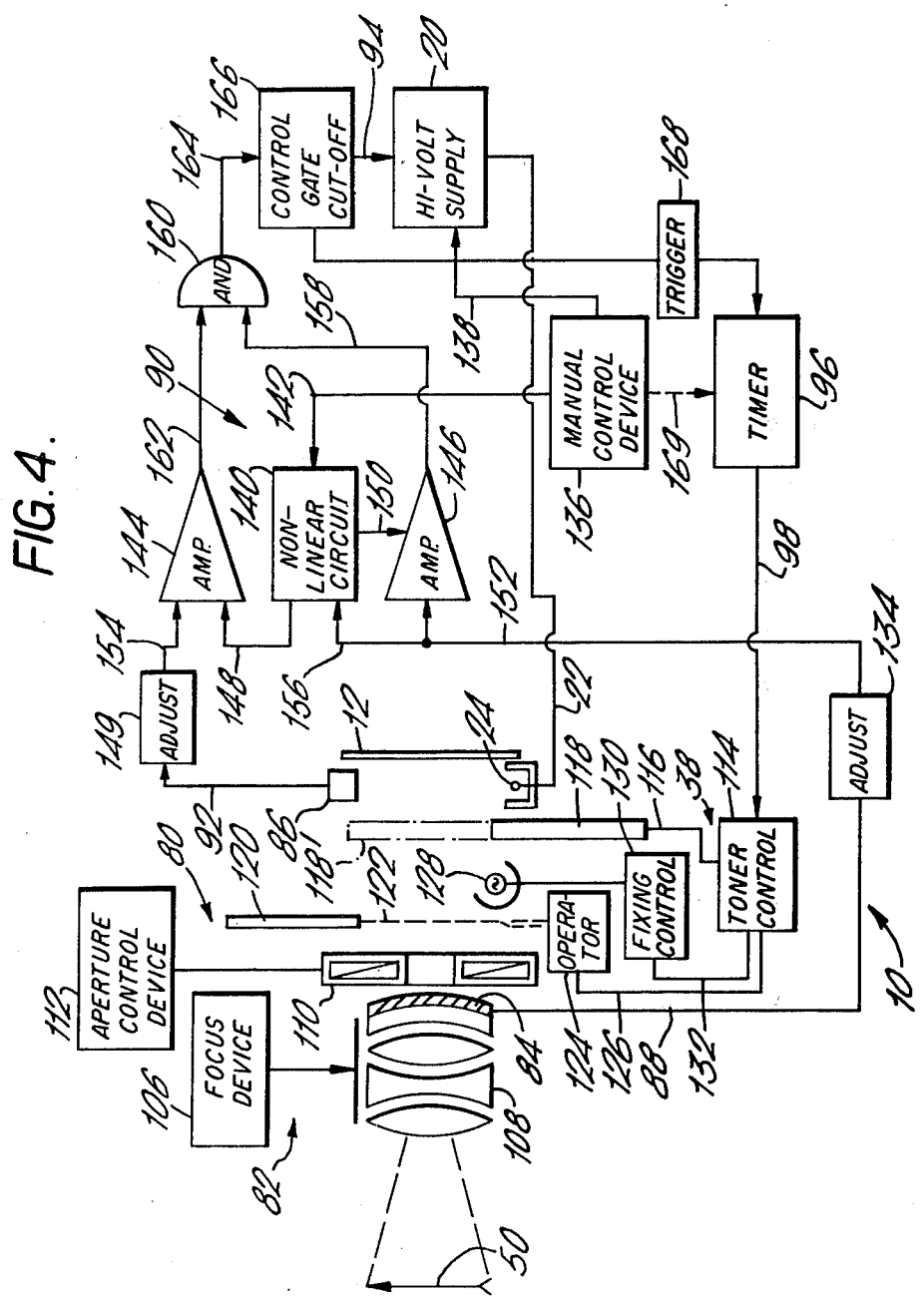
FIG. 4 is a diagrammatic view similar to that of FIG. 1 but showing more details of the apparatus.

The camera structure 10 is illustrated in FIG. 4 which shows some of the control apparatus and components in greater detail, including means for fixing the toner and means for operating a mask or blind as accessories or added features for the camera 10.

The optics 82 comprise a manual device 106 which is used to achieve proper focus of a lens system 108 that comprises one or more photographic lenses. The aperture or iris 80 comprises a mechanically adjustable aperture forming structure 110 controlled by any suitable mechanism 112. The toning means 38 in this Figure is shown by the toner control 114 that has a coupling or connection 116 with a toning device 118 that could include the components 40 and 42 (FIG. 2) or other components. The toner control 114 could be for example an electric circuit including a motor for driving a member such as 42 against a carrier, container or capsule of toner 40. It could also include some form or linkage or driving mechanism which can move the toning device 118 into position directly over the film 12 as indicated by the dashed line position 118'.

A variety of different forms of toning apparatus could be used, some of that described being disclosed in copending application Ser. No. 323,108. The toning structure could be arranged to frame the film 12 so as to enable toner flooding without movement or could be moved into position to be close to the photoconductive surface 18 and thereby enable the best use of the biasing means 100. Swinging structures are capable of being used also.

Mention has been made above of the use of a blind or mask which comes into position to block light when the toning period is commenced. This could be in the form of a simple blind 120 coupled by the connection 122 to some form of operator 124 controlled through the line or coupling 126 by the same toner control 114 that operates the toning device 118. The linkages or connections 116 and 126 could be the same since the blind 120 should be moved into place simultaneously with the commencement of the toning period or immediately after its starts. It should be understood that the blind is not essential since the flooding of the film surface 18 with toner effectively cuts off the light from the scene 50 and "freezes" the latent image. The blind 120 would be advantageous in situations where the toning device is moved over the film 12 and the speed of such movement is slow enough so that there is a percentable difference in exposure between the first section of the film to be blocked by the toning device and the last section. It would also be advantageous where it is desired to move the film member 12 laterally to be aligned with the toning device 118 instead of moving the toning device itself.

A heat lamp 128 comprises a toner fixing device and may be operated and controlled by a suitable circuit or device 130 which in turn could be operated by the toner control 114 through the line 132. The arrangement could be such that the fixing occurs at the end of the toning period. The toner fixing device could alternatively be operated by an independent manual control (not shown).

In this FIG. 4 the photoresponsive device 84 comprises a transparent photocell as disclosed in said copending application Ser. No. 397,308 coated onto a lens of the optical lens system 108 as indicated. The connection from the photocell 84 to the control circuit 90 is on the line 88 which includes an adjusting circuit 134 to enable the relationship between the output of the photocell 84 and the output of the probe 92 to be adjusted.

Assuming that the control circuit 90 includes a manual control device 136 in the form of a switch or electronic programming device that starts a sequence of operations and is connected to or provides connections to a suitable source of power for operating the various components, the operator presses a button to start the operation of the camera after focus and aperture have been adjusted and a film member 12 is in place. The high voltage power supply 20 is energized through the line 138 and at the same time the nonlinear circuit 140 may be enabled through the line 142. This makes the amplifiers 144 and 146 receptive to signals but not necessarily responsive to such signals. These amplifiers receive signals from the circuit 140 which has the desired characteristics of the control circuit 90 built into it. Additional adjusting circuits may be provided as indicated at 134 and 149 to provide a greater flexibility in adjusting the characteristics of performance.

The overall effect is that there is a different surface potential which it is desired to achieve for every condition of lighting intensity which can produce recorded images on the electrophotographic film 12. The range of lighting intensities afforded by the film of the co-pending application Ser. No. 378,180 is substantially greater than that of known electrostatic members of photoconductive coatings, so far as known. The different surface potentials achieved, measured at a darkened location, preferably for accurate reproducability, can be ascertained by relatively simple experiment, and the function built into the circuit 90 and specifically the nonlinear circuit 140 so that the amplifiers 144 and 146 will provide the desired control signal with equal inputs. Other relationships are possible, of course, but render the circuitry more complex.

Each amplifier 144 and 146 receives a signal from the nonlinear circuit 140 on the lines 148 and 150 respectively. At the same time the amplifiers receive signals from the electrostatic voltage measuring device 86 and the photocell 84 on the lines 152 and 154, respectively. The signal from the photocell 84 is also applied to the nonlinear circuit by way of the lead 156 to exercise the control since the output from the circuit 140 controls the outputs at 148 and 150. Since the signal at 152 does not vary for any given set of conditions, the output from the amplifier 146 is a fixed signal appearing at 158 and is applied to an input of the AND gate 160.

Assuming that the conditions of the light intensity and the surface potential are those at the beginning of a cycle, say at the time shortly after zero on the curve 32 of FIG. 3, the circuitry is adjusted so that there is no signal at 162 until the signal at 154 is the same as the signal at 148. It is appreciated that the signal at 148 is one which is produced by the combination of the signal 156 and the parameters of the circuit 140 as woeked out for the time of film 12 being used. Obviously different types of film will require different non-linear circuits or practically may produce a good characteristic by suitable adjustment of the circuits 134 and 149. The high voltage supply 20 keeps raising the voltage of the corona wire 24 and the surface potential along the line 32 of the graph of FIG. 3.

As this charge build up, the signal at 154 rises until it reaches the same value of the signal at the input line 148. In this case the amplifier 144 is an operational amplifier whose terminals and feedback connections are arranged in such a manner that if the input signals are unequal there is no output at 162, but if the input signals are equal there will be an output. As soon as the signal at 154 reaches the value of the signal at 148 there will be an output at 162 and since there already is a signal at 158, both inputs to the AND gate 160 are satisfied and there is a signal output on the line 164 out of the AND gate 160.

With a signal at the output 164 the control gate cutoff 166 is energized and this serves to cut off the high voltage supply through the line 94. The time elapsed is the time for the surface potential of the electrophotographic film 12 to reach the voltage which is chosen as optimum for the prevailing light conditions as measured by the photocell 84. At the same time the control gate cutoff 166 or a trigger circuit 168 energized through the line 170 can initiate the operation of a timer 96 which in turn starts and controls the operation of the toning device 38, toner fixing means 130, operation of the blind, movement of the toning device 118, movement of the film, etc. The timing may be related to the voltage reached by the surface of the film 12 or may be independent therefrom as explained above. If independent, the timing period may be commenced as soon as the entire circuit is energized as indicated by the broken line coupling 169 from the manual control device 136.

Figure 5:
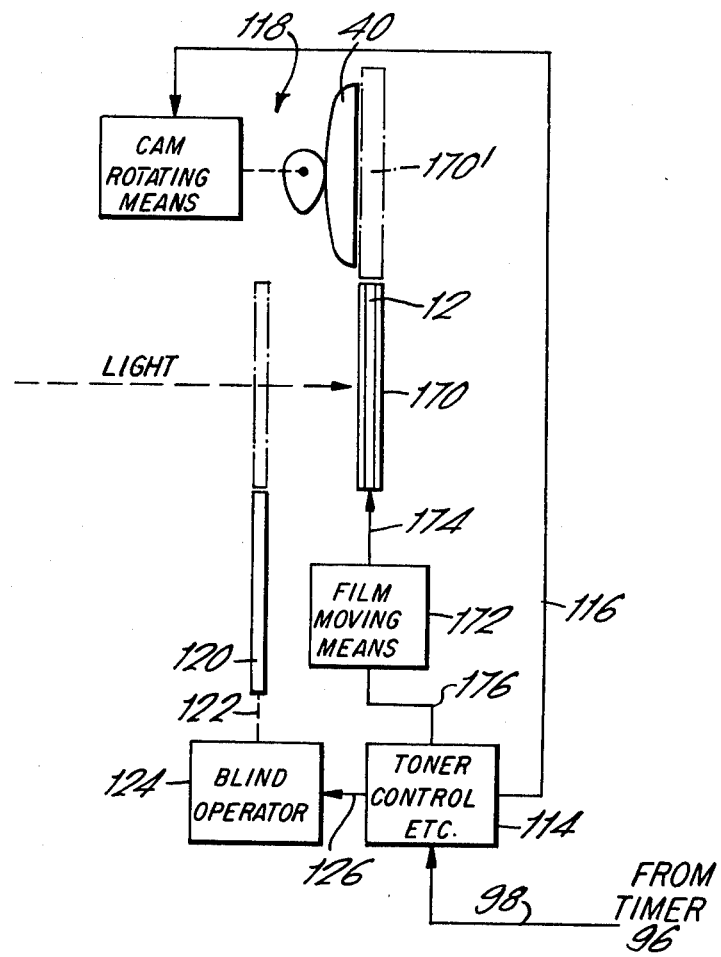
FIG. 5 is a diagrammatic view of certain parts of a modified form of camera.

In FIG. 5 there is illustrated in diagram form some of the components of a camera in which the toning device 118 is located out of the light field and it is required that the film 12 be moved to the location of the toning device in order to be toned. The electrophotographic film 12 is mounted in a carrier 170 which is capable of being moved vertically to the broken line position 170' by suitable mechanical means such as a spring operated mechanism or an electromagnetic or electrical contrivance. The moving means is shown at 172 coupled to the carriage 170 at 174 driven by the coupling 176 from the toner control means 114. In this case, in order to prevent blurring of the latent image when the film 12 is moved, it is essential that the blind 120 be moved to intercept the light before movement of the film commences. This is readily achieved by providing a slight delay between the enabling of the blind operator 124 and the operation of the film moving means 172. Note that the blind 120 moves upward in this view to the position 120' but this is not essential. The movement of any of the components may be laterally, rectilinearly, or in swinging movements.

Since the blind 20 is not a shutter, need not be complicated by speed adjusting means, and has no control of the exposure of the film, it can be made extremely simple and with very little mass and hence small inertia. Its speed can be quite high so that the delay between movement of the film and the operation of the blind can be practically zero. Such a blind easily can be built to blank out the film 12 from light in a fraction of a millisecond. The speed with which the carriage 170 then moves the film 12 from its normal to toning position 170' need not be great, so that the mechanism for accomplishing this can be rugged and simple. For example, looking at the graphs of FIG. 3, all of the dark decay lines, but for the line 44, are so flat that there wil be practically no loss of charge if the toning is commenced several milliseconds after the charging stops. Even the increments of the film charged above saturation in cases where the incident light has been of very low intensity will suffer very little if toning commences a few milliseconds after charging has stopped in order to give the film an opportunity to move to its position opposite the toner capsule 40. In cases where the charging carries the surface potential to values below saturation, delays of as mush as several hundred milliseconds before toning will not materially alter the image quality since the loss of charge will amount to a fraction of a volt in most cases, if that.

The camera of the invention is capable of considerable variation in accordane with the teachings herein. Different circuitry and mechanical means can be used to accomplish the functions which are described other than those already mentioned. The characteristics of the film 12 are such that the means are capable of a wide gamut of structure and circuitry. For example, since the surface of the film itself is glassy hard and highly abrasion resistant, mechanical means for handling and translating the film need not be specially constructed and protected to prevent contact with the film.

In the description and discussion above, some of the details which are quite obvious have been omitted. For example, the overall power supply for the camera and its internal circuitry would normally be provided by batteries, either with or without an electrical attachment for connecting the camera to an external power source of electric current. The photocell 84 requires a constant current source such as might be provided by a battery. A switch could be provided to keep the photocell inoperative when the camera is not being used to preserve the battery. In sophisticated cameras or camera systems the principle operating functions can be timed and programmed by suitable small motors or mechanical timers. In simple cameras functions may be manually effected by the operator.

Generally, the systems of the camera will be in quiescent state when the camera is not being used, the power turned off and so on. When the camera is to be used, the projector system is uncovered, cartridges of toner are installed, the film member is placed in position, the batteries checked and other adjustments made, such as for example, in connection with the components 134 and 149. The camera is pointed at the scene 50 and a button is pressed which starts the operation of the automatic systems. Semi-automatic and manual portions of the camera apparatus will be acomplished after the charge-exposure period has been completed. Some means to start everything has to be provided, this being either a manual activity of the operator or an indirect activity such as the use of an electrical pulse which in turn is produced by a manual activity of the operator.

Mention has been made of the use of the camera of the invention to record photographs of moving scenes without a shutter. In the case of photographic film the incident light produces a permanent chemical change in the photosensitive components of the emulsion. A high speed film used with a long exposure to produce a blur. All that is meant by high speed in such a film is that the film responds chemically at high speed and hence an extremely short exposure will produce a great chemical change. Thus, the shutter speed is a vital factor in achieving the desired results, the moving scene being "stopped" only because it is permitted to enter the darkened chamber which contains the film for a fleeting instant of time. Notwithstanding such high speed film, focal plane shutters stop motion effectively by "wiping" images onto the film through the use of fast-moving fine slits passing over the surface of the film.

The response of a high speed electrophotographic film is not chemical but is electrical. Assuming a condition of charge being applied to the film, a moving scene will shift the pattern of light across the photoconductive surface of the film and as this is done, theoretically the latent image will wholly shift with the moving scene. Increments which were subjected to light and discharged and thereafter subjected to darkness will become recharged assuming that the corona remains effective during this period of time. Conversely, increments which were dark and retained charge may shortly thereafter be illuminated and thus discharged. The requirement for capturing a moving scene in a shutterless camera is that the rate at which the film accepts charge and is able to discharge must be greater than the rate at which the scene moves. If this can be achieved in a practical film, then it would be feasible to have a shutterless camera which could "photograph" moving scenes.

As stated above, the film of the copending application Ser. No. 378,180 is a high speed electrophotographic film capable of being used in a shutterless camera whose structure is detailed herein, but its rate of acceptance of charge and gain, while quite substantially greater than known electrostatic members which are practical or commercially available nevertheless is insufficient to permit shutterless recording of any but the slowest of moving scenes. The capture of moving scenes in cameras with shutters is quite practical and has been accomplished at speeds of fractions of a second as can be readily ascertained from a study of the graphs of FIG. 3, but in such cameras it is presumed that the photoconductive coating is fully charged in darkness before being quickly exposed. The slope of the first portion of the line 34 is shown to be less than it actually is for the film described in the copending application so that ordinary motion capable of being stopped by the conventional photographic camera can likewise be stopped by said film. It should be kept in mind that the shutterless camera of the invention has the exposure and the charging of the photoconductive coating occurring simultaneously.

Some of the features and teachings of the invention are applicable to cameras with shutters but the invention is principally directed to the application thereof to a shutterless camera. It is to be understood that reference to a blind herein is not to be considered the same as reference to a shutter. The function of a blind as used herein is not to control the exposure but merely to cut off the light when toning or moving the film member 12 or both.

The invention herein is not limited to the production of monochromatic images on the film 12 but includes the production of color images where successive exposures, specially constituted film and/or multiple toning steps can achieve colored images on the film. The film can be single slides which are capable of being handled individually or can be in the form of rolls with means to move a single frame into position to be charged and exposed.

Considerable variation can be made without departing from the spirit or scope of the invention as defined in the appended claims. Ordinarily, reference to a camera is intended to mean a self-contained article that may be independent of other apparatus. Ordinarily, reference to a camera system could mean apparatus which has a camera built into it and may include other components and devices or accessories which are intended for more than just recording images. In the claims reference to a camera is intended to include both so long as the structure called for is utilized in the camera or camera system.

In considering the construction of a practical camera, it has been explained herein that of the parameters which are involved, the adjustment of the charge potential on the surface of the film 12 in relation to the incident light is most advantageous. The reason is that the sensitivity of the film is thereby controlled. It is feasible to keep the charging time constant, resulting in fixed sensitivity of film in which case the aperture 80 can be adjusted manually or automatically to provide the best light conditions for the fixed sensitivity. Other parameters which could be controlled, alone or in combination, are the time of toner application and the voltage of the toner bias. In some cases, there may be a slight delay following the charging period which in effect extends the exposure time beyond the charging time.

What it is desired to secure by Letters Patent of the United States is:

1. The method of making a visible image on an electrophotographic film member having a photoconductive coating which comprises:
   A. exposing the coating to a substantially still light pattern for a time period,
   B. simultaneously charging the coating during exposure and for the same period of time with a potential having a rising characteristic and at a rate which results in a net excess of charge distributed over the coating corresponding in variation to the light pattern at the end of the said charging and exposing period,
   C. sensing the absolute potential of the surface charge on said coating at a dark area thereof during the charging and sensing the average light flux of said pattern and deriving respective first and second signals therefrom,
   D. comparing the signals and deriving from said comparison a triggering signal for any value of a first signal which corresponds to a particular second signal in accordance with a predetermined relationship when the first signal reaches said value,
   E. sequentially disabling the charging when the triggering signal is produced to establish the end of said time period and immediately toning the photoconductive coating for a length of time which is required to produce an observable visible image.

2. The method as claimed in claim 1 in which the toning is continued for a predetermined length of time after the charging period commences sufficient to produce a visible image from said latent image.

3. The method as claimed in claim 1 in which the light flux is cut off from said coating by said triggering signal at a time just prior to the toning.

4. The method as claimed in claim 3 in which the toning is continued for a length of time that is related to the charge potential reached by charging.

5. The method as claimed in claim 4 in which the toning is continued for a length of time that is an inverse function of the peak charging potential.

6. A method of electrostatically producing toned visible images of a substantially still light pattern on a photoconductive member whose rate of charge acceptance is greater than the rate of discharge due to the light pattern, said method comprising charging said member while simultaneously exposing same to the light pattern, simultaneously sensing both the surface charge potential on the member during charging and the average light flux of the pattern and deriving therefrom respective first and second signals, comparing the first and second signals and deriving from the comparison a triggering signal for any level of light flux when the charge potential reaches a peak value previously established as desirable for any particular light flux level sensed and terminating the charging duration and immediately initiating toning of the member when the triggering signal is produced.

7. The method as claimed in claim 6 in which the charging is effected at a rate resulting in a net excess of charges distributed over the member corresponding in variation to the light pattern.

8. The method as claimed in claim 6 in which a portion of the member surface is maintained in darkness and the charge potential sensed is the absolute potential on that portion of the surface that remains in darkness.

9. The method as claimed in claim 6 in which the light pattern is blocked from the member at the time toning is commenced.

10. The method as claimed in claim 6 in which the photoconductive member is withdrawn from exposure between cessation of charging and the commencement of toning.

11. The method as claimed in claim 6 in which the duration of toning is maintained for a period of time which depends upon the peak charging potential and is an inverse function thereof.

12. The method as claimed in claim 6 in which a biasing potential is applied during toning to drive toner particles to the coating.

13. The method as claimed in claim 6 in which the toning is commenced at a predetermined time after charging commences and is maintained until a visible image is observed.

* * * * *

UNITED STATES PATENT AND TRADEMARK OFFICE
CERTIFICATE OF CORRECTION

PATENT NO. : 3,973,956
DATED : August 10, 1976
INVENTOR(S) : MANFRED R. KUEHNLE

It is certified that error appears in the above-identified patent and that said Letters Patent are hereby corrected as shown below:

Col. Abs., line 14, change "prjecting" to --projecting--; col. abs., line 18, change "flm" to --film--; col. 7, line 42, change "from" second occurence to -- form --; Col. 8, line 46, "dacay" should read -- decay --;Col. 8 line 64,"practially" should read --practically--; col. 9, line 3, after "area" insert --; of the photoconductive surface 18 will have no increment--; col. 10, line 28, change "is" to --be--; col. 11, line 24, change "king" to --kind--; col. 11, line 54, before "fixed" insert --be--; col. 13, line 27, after "members" change "of" to --or--; col. 13, line 57, change "woeked" to --worked--; col. 14, line 63, change "wil" to --will--; col. 15, line 10, change "accordane" to --accordance--; col. 17, line 13, after "in" insert --a--

Signed and Sealed this

First Day of March 1977

[SEAL]

Attest:

RUTH C. MASON
Attesting Officer

C. MARSHALL DANN
Commissioner of Patents and Trademarks